(12) United States Patent
Lee et al.

(10) Patent No.: US 11,339,857 B2
(45) Date of Patent: May 24, 2022

(54) ACTUATOR

(71) Applicant: SEGOS CO., LTD., Incheon (KR)

(72) Inventors: Doo Myun Lee, Incheon (KR); Sung Joon Kang, Incheon (KR); In Suk Ra, Bucheon-Si (KR); Jung Kyu Lim, Incheon (KR); Sung Woo Kim, Incheon (KR); Jae Hyuk Lim, Siheung-Si (KR)

(73) Assignee: SEGOS CO., LTD., Incheon (KR)

( * ) Notice: Subject to any disclaimer, the term of this patent is extended or adjusted under 35 U.S.C. 154(b) by 0 days.

(21) Appl. No.: 16/980,610

(22) PCT Filed: Mar. 4, 2019

(86) PCT No.: PCT/KR2019/002469
§ 371 (c)(1),
(2) Date: Sep. 14, 2020

(87) PCT Pub. No.: WO2019/177292
PCT Pub. Date: Sep. 19, 2019

(65) Prior Publication Data
US 2021/0010574 A1    Jan. 14, 2021

(30) Foreign Application Priority Data

Mar. 14, 2018   (KR) ........................ 10-2018-0029717

(51) Int. Cl.
*F16H 19/04*        (2006.01)
*F16D 7/10*         (2006.01)
(Continued)

(52) U.S. Cl.
CPC ............... *F16H 19/04* (2013.01); *F16D 7/10* (2013.01); *F16H 1/203* (2013.01); *F16H 35/10* (2013.01);
(Continued)

(58) Field of Classification Search
CPC ........ F16H 1/203; F16H 19/04; F16H 57/039; F16D 7/10; H02K 7/1166
(Continued)

(56) References Cited

U.S. PATENT DOCUMENTS 4,619,151 A * 10/1986 Trachman ............. F16H 63/304
                                                      185/40 R
2004/0035235 A1* 2/2004 Sasaki ..................... F16H 19/04
                                                      74/422

(Continued)

FOREIGN PATENT DOCUMENTS

JP       2006-282097 A        10/2006
JP       2018009654 A *       1/2018 ............. F16H 35/10
(Continued)

*Primary Examiner* — Joseph Brown
(74) *Attorney, Agent, or Firm* — Novick, Kim & Lee, PLLC; Jae Youn Kim (57) ABSTRACT

One embodiment of the present invention provides an actuator comprising: a housing having a mounting space part formed therein; a motor part provided inside the housing and generating power; a reduction gear part of which a plurality of gears respectively having an internal gear and an external gear sequentially engage with each other so as to transmit the power generated in the motor part; and a rod part engaging with the gear disposed at the last position, and linearly moving according to the rotation of the gear, wherein one of the plurality of gears is formed such that the internal gear and the external gear can rotate together or rotate independently.

8 Claims, 11 Drawing Sheets

(51) Int. Cl.
*F16H 1/20* (2006.01)
*F16H 35/10* (2006.01)
*F16H 57/039* (2012.01)
*H02K 7/116* (2006.01)

(52) U.S. Cl.
CPC ......... *F16H 57/039* (2013.01); *H02K 7/1166* (2013.01); *F16H 2019/046* (2013.01)

(58) Field of Classification Search
USPC .............................. 74/29, 33, 89.17, 424.6
See application file for complete search history.

(56) References Cited

U.S. PATENT DOCUMENTS

| | | | |
|---|---|---|---|
| 2005/0006832 | A1 | 1/2005 | Hoshi et al. |
| 2015/0027247 | A1 | 1/2015 | Kamada |
| 2015/0185775 | A1* | 7/2015 | Vroom .................... G05B 9/02 74/89.17 |
| 2015/0233452 | A1* | 8/2015 | Martinez ................ E05B 81/25 74/89.14 |

FOREIGN PATENT DOCUMENTS

| | | | |
|---|---|---|---|
| KR | 10-2010-0116142 A | | 10/2010 |
| KR | 10-2011-0040037 A | | 4/2011 |
| KR | 10-1321907 B1 | | 10/2013 |
| KR | 10-2016-0135436 A | | 11/2016 |
| KR | 20170042191 A | * | 4/2017 |
| WO | 2007090210 A2 | | 8/2007 |

* cited by examiner

ACTUATOR

TECHNICAL FIELD

The present invention relates to an actuator, and more particularly, to an actuator provided with a gear formed so that an external gear and an internal gear thereof are rotated together or independently.

BACKGROUND ART

Gears are engaged with adjacent gears in a state of being fitted around a shaft and thereby transmit power.

Such gears may be provided in various power transmission devices, and for example, the gears may be provided in actuators.

In general, when an actuator is provided with gears, a plurality of gears may be provided. In this case, the plurality of gears are configured to reduce a rotational speed of a motor part and increase torque transmitted to a rod part extracted or retracted in a longitudinal direction thereof.

Such an actuator may be used in various home appliances such as washing machines, refrigerators, and dishwashers. For example, when an actuator is used to automatically retract or extract a drawer of a refrigerator, the conventional actuator has a problem in that, in a process of automatically extracting or retracting the drawer of the refrigerator, when the drawer of the refrigerator is not extracted properly due to an obstacle, overload occurs in a motor part that transmits power to a rod part. The overload that occurs in the motor part is a major cause of failure of the motor part.

When a user directly extracts or retracts the drawer with a certain force or more, internal components of the actuator may be damaged.

DISCLOSURE

Technical Problem

The present invention is directed to providing an actuator provided with a gear formed so that an external gear and an internal gear thereof are rotated together or independently.

Technical Solution

According to one embodiment of the present invention, an actuator includes a housing having an installation space portion formed therein, a motor part provided inside the housing and configured to generate power, a reduction gear part in which a plurality of gears each including an internal gear and an external gear are engaged in consecutive order to transmit the power generated from the motor part, and a rod part engaged with the endmost gear and linearly moved as the gear is rotated, wherein any one of the plurality of gears is formed so that the internal gear and the external gear are rotatable together or independently.

The reduction gear part may include a first gear which includes a first external gear engaged with a worm coupled to the motor part and a first internal gear integrally coupled with the first external gear, wherein the first external gear is formed as a worm wheel, a second gear which includes a second external gear engaged with the first internal gear and a second internal gear integrally coupled with the second external gear, a third gear which includes a third external gear engaged with the second internal gear and a third internal gear integrally coupled with the third external gear, and a fourth gear which includes a fourth external gear engaged with the third internal gear and a fourth internal gear separately formed and coupled with the fourth external gear and engaged with a rack gear formed in the rod part, wherein the fourth gear is formed so that the fourth internal gear and the fourth external gear are rotated together or independently.

The actuator may further include a fixing stopper which is inserted into a fixing shaft of the housing and presses a fixing protrusion formed in the rod part and prevents shaking of the rod part in a state in which the rod part is completely retracted.

The fixing stopper may include a body portion having a through-hole, into which the fixing shaft is inserted, formed therein, a first extension portion protruding from the body portion, a second extension portion protruding from the body portion by forming a preset angle with the first extension portion, and an elastic pressing portion provided at an end of the second extension portion to press the fixing protrusion, wherein rotation ranges of the first extension portion and the second extension portion are restricted by a first rotation preventing portion protruding from a first plate provided in the housing and a second rotation preventing portion protruding from a second plate provided in the housing.

The actuator may further include a slide stopper which moves along a slide rail formed in the housing and restricts movement of the rod part, wherein the slide stopper includes a connection bar and a first stopper and a second stopper provided at both ends of the connection bar, and the first stopper and the second stopper are formed to restrict movement of a movement adjusting portion provided in the rod part.

The gear, which is formed so that the internal gear and the external gear are rotatable together or independently, may include the external gear which has a first hole, into which a support shaft is inserted, formed in a center thereof, a boss portion which has a hollow circular pipe shape so that an accommodation space portion is formed therein, protrudes from an upper surface of the external gear around the first hole, and has pin guide grooves formed therein at preset intervals, a plurality of pins which have a cylindrical shape and are disposed in the pin guide grooves, an elastic portion which is inserted into the accommodation space portion and elastically supports the pins, and the internal gear which has a second hole, into which the support shaft is inserted, formed in a center thereof and which has an insertion groove, into which the boss portion is inserted, formed in a lower surface thereof, wherein coupling grooves having a concave shape, in which the pins are seated, are formed to be serially connected in a circumferential surface of the insertion groove.

The elastic portion may include a body plate portion which has a hollow cylindrical shape and has an elastic adjustment space portion formed so that one end and the other end of the body plate portion are spaced apart from each other, and a plurality of fixing portions protruding downward from the body plate portion, wherein the fixing portion is inserted into a fixing hole formed in the upper surface of the external gear.

The fixing hole may be formed to have a width and a length that are greater than a width and a length of the fixing portion.

The pin guide groove may be configured to guide a moving direction of the pin when the elastic portion is compressed or restored, and the pin guide groove may be formed to be gradually widened in an outward direction.

Advantageous Effects

Effects of an actuator according to the present invention will be described as follows.

According to the present invention, any one of a plurality of gears provided in the actuator is formed so that an external gear and an internal gear thereof are rotated together or independently. That is, when a certain force or more is applied to the external gear or the internal gear, the external gear or the internal gear can be rotated independently.

Accordingly, when the gear is provided in the actuator, a motor part provided in the actuator can be prevented from being overloaded due to the gear. Accordingly, failure of the motor due to overload can be prevented.

It should be understood that the effects of the present invention are not particularly limited to those described above, and the present invention includes all effects that can be deduced from the detailed description of the invention or the configurations of the invention described in the claims.

DESCRIPTION OF DRAWINGS

FIG. 5 shows

MODES OF THE INVENTION

Hereinafter, the present invention will be described with reference to the accompanying drawings. However, it is to be noted that the present invention is not limited to the embodiments and can be realized in various other ways. In the drawings, certain parts not directly relevant to the description are omitted to enhance the clarity of the present invention, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "indirectly connected or coupled to" another element via still another element. In addition, unless explicitly described to the contrary, "comprising" or "including" any components will be understood to imply the inclusion of other components rather than the exclusion of other components.

In the present invention, the terms "on and below" imply being positioned on or below a target element and do not imply being necessarily positioned on or below the target element on the basis of a gravity direction.

Hereinafter, embodiments of the present invention will be described in detail with reference to the accompanying drawings.

Figure 1:
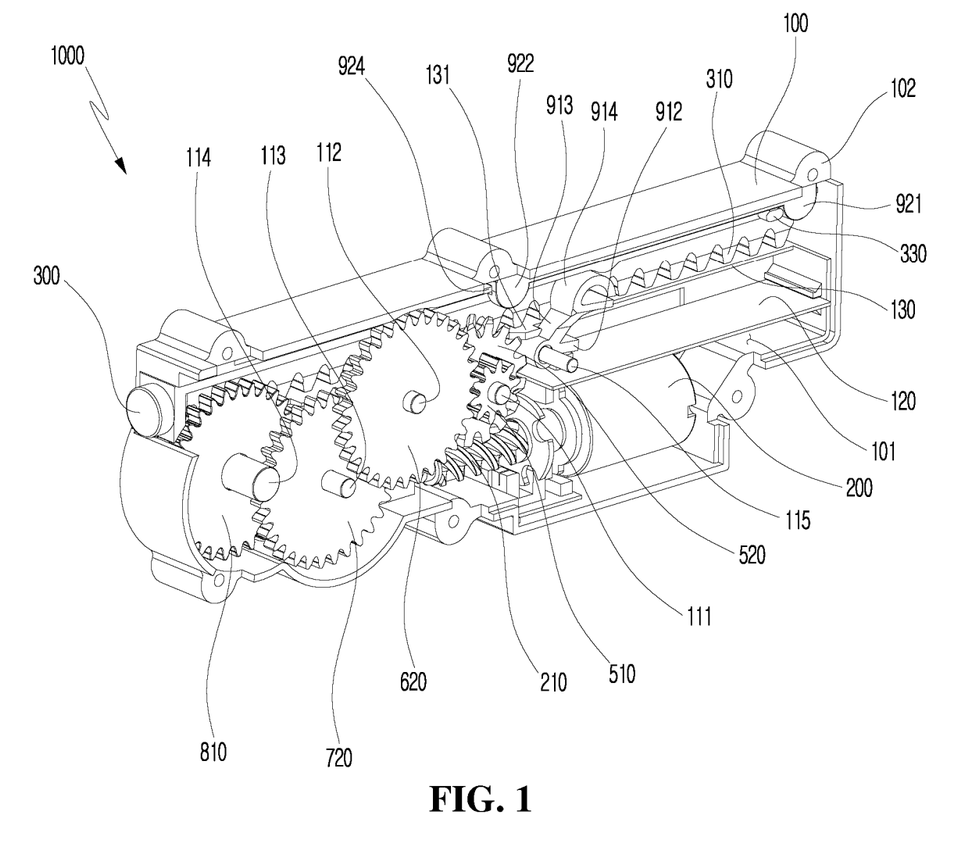
FIG. 1 is a perspective view of an actuator according to one embodiment of the present invention.
Figure 2:
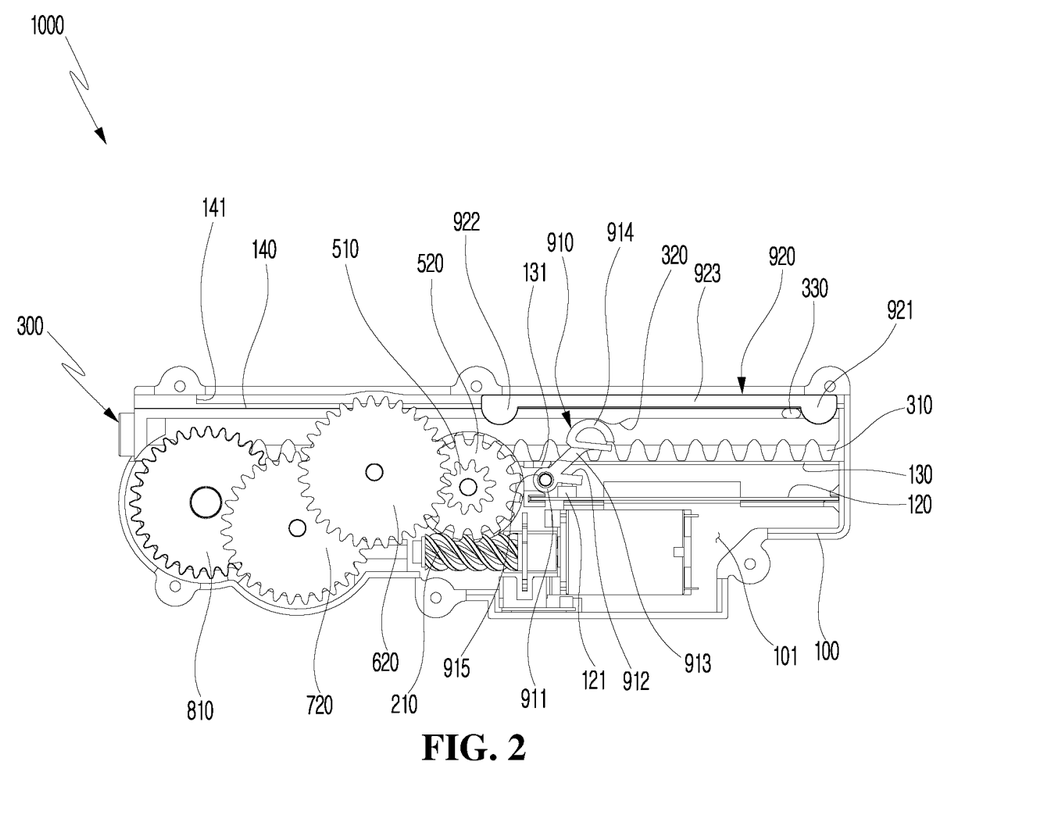
FIG. 2 is a front view of the actuator according to one embodiment of the present invention.
Figure 3:
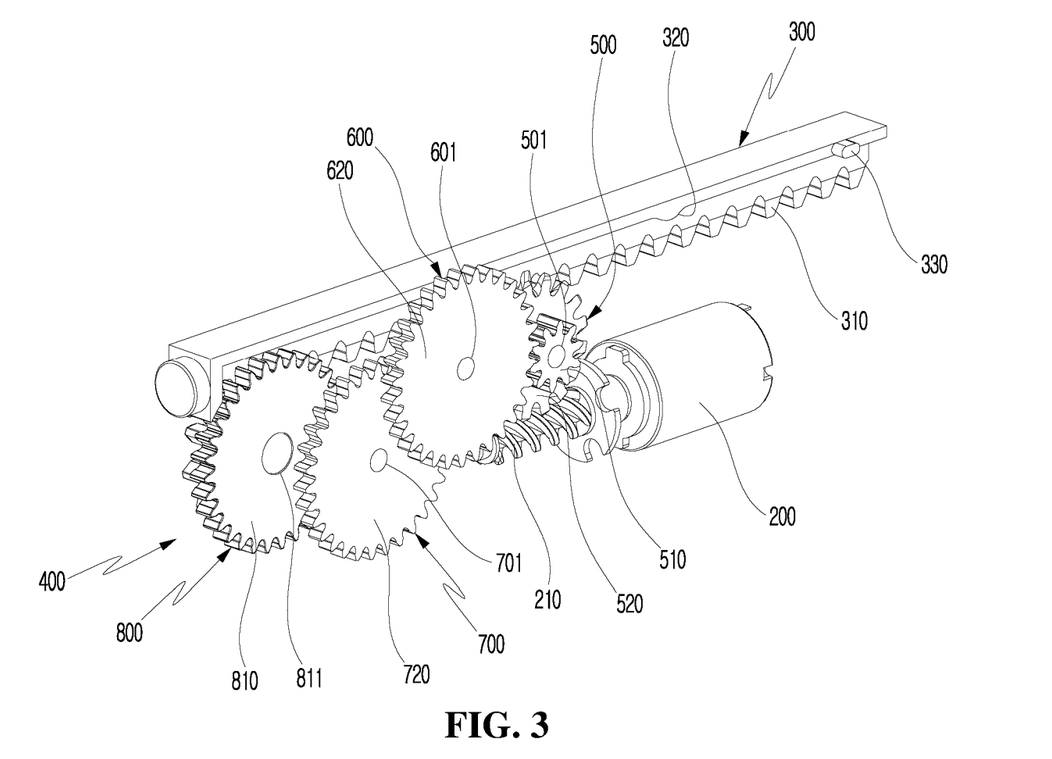
FIG. 3 is a perspective view of a coupling between a motor part, a reduction gear part, and a rod part viewed from the front according to one embodiment of the present invention.
Figure 4:
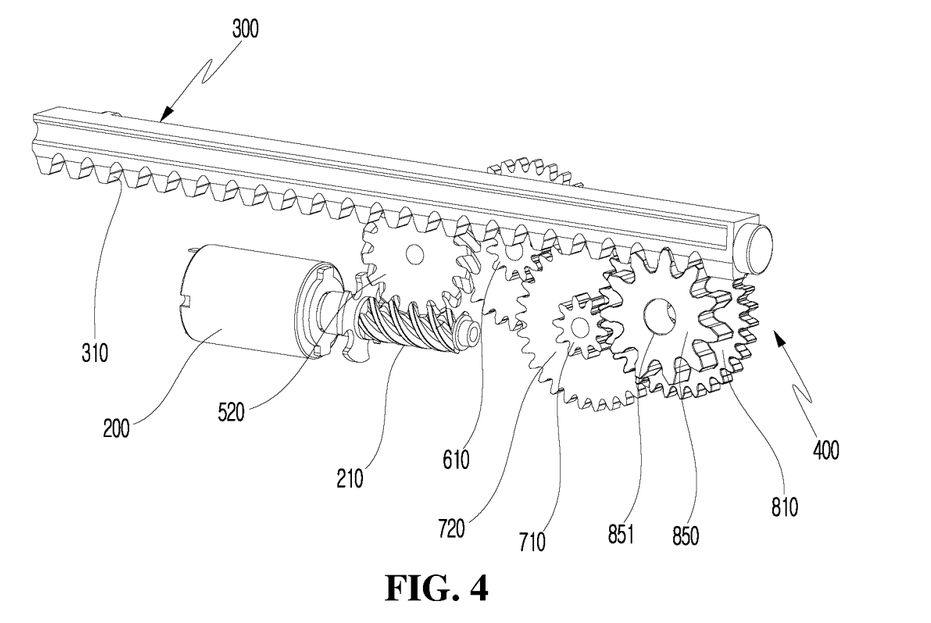
FIG. 4 is a perspective view of the coupling between the motor part, the reduction gear part, and the rod part viewed from the rear according to one embodiment of the present invention.
Figure 5A:
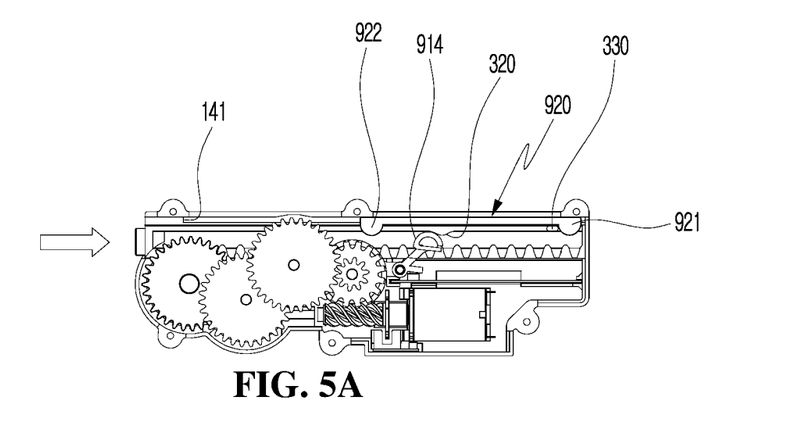
FIGS. 5A-5B show views of operation states of the actuator according to one embodiment of the present invention.
Figure 5B:
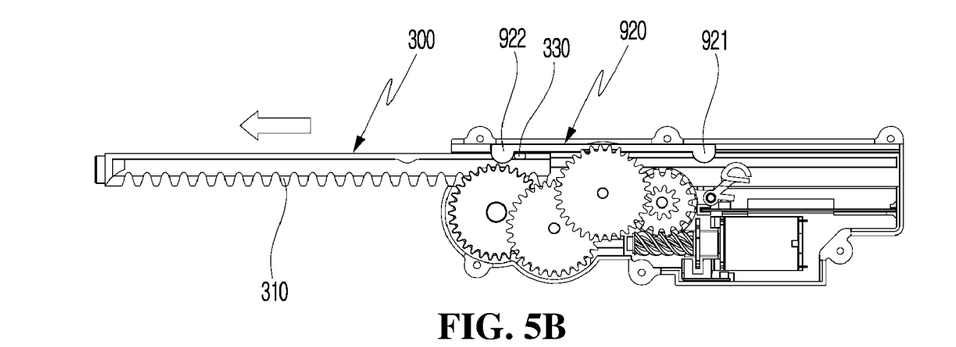

FIG. 1 is a perspective view of an actuator according to one embodiment of the present invention, and FIG. 2 is a front view of the actuator according to one embodiment of the present invention. FIG. 3 is a perspective view of a coupling between a motor part, a reduction gear part, and a rod part viewed from the front according to one embodiment of the present invention, and FIG. 4 is a perspective view of the coupling between the motor part, the reduction gear part, and the rod part viewed from the rear according to one embodiment of the present invention. FIGS. 5A-5B show views of operation states of the actuator according to one embodiment of the present invention.

As shown in FIGS. 1 to 5A-5B, an actuator 1000 may include a housing 100, a motor part 200, a rod part 300, and a reduction gear part 400.

Here, the housing 100 forms an exterior of the actuator 1000.

An installation space portion 101 may be formed in the housing 100, and thus, various components such as the motor part 200, the rod part 300, and the reduction gear part 400 may be provided in the housing 100. Accordingly, the various components provided in the installation space portion 101 may be protected from the outside by the housing 100.

The housing 100 is provided with coupling portions 102. Therefore, an operator may couple the actuator 1000 to various devices using coupling members such as bolts. For example, the actuator 1000 may be used to automatically open and close a door, a drawer, and the like provided in a home appliance such as a refrigerator or a washing machine. The actuator 1000 may also be used to automatically open and close a drawer of a desk, a kitchen sink, or the like. The present invention is not limited to the above-described devices, and of course, the actuator 1000 may be used even in various other devices.

The housing 100 is provided with support shafts for supporting a plurality of gears each including an internal gear and an external gear provided in the reduction gear part 400. In this case, the number of the support shafts provided in the housing 100 corresponds to the number of the gears provided in the reduction gear part 400.

An operator may optionally adjust the number and size of the gears provided in the reduction gear part 400 in consideration of a reduction gear ratio and the like.

In the present invention, an example of the reduction gear part 400 including four gears will be described. As described above, when the actuator 1000 is provided with first to fourth gears 500 to 800, the housing 100 is provided with first to fourth support shafts 111 to 114 for supporting the first to fourth gears 500 to 800.

Meanwhile, the motor part 200 is provided in the installation space portion 101 and generates power of the actuator 1000. The motor part 200 may be a motor. The motor part 200 may be formed so as to be rotatable forward and in reverse. Accordingly, a helical worm 210 coupled to the motor part 200 may be rotated clockwise or counterclockwise in a rotation direction of the motor part 200.

The motor part 200 transmits power to the reduction gear part 400.

Here, the reduction gear part 400 may include the first gear 500, the second gear 600, the third gear 700, and the fourth gear 800.

The first to fourth gears 500 to 800 are each formed so as to be provided with an internal gear and an external gear together. In this case, an example will be described in which the first and third gears 500 to 700 are formed in a form in which the internal gear and the external gear thereof are integrally formed and the fourth gear 800 is formed in a form in which the internal gear and the external gear thereof are not integrally formed and are independently separated from each other so as to be independently rotatable.

As described above, a gear formed so that an internal gear or an external gear is independently rotatable is not necessarily limited to the fourth gear 800, and of course, other gears may be formed in such a form.

Here, the first gear 500 includes a first internal gear 510 and a first external gear 520. A first support hole 501 is formed in a center of the first gear 500, and a first support shaft 111 is inserted into the first support hole 501 to pass therethrough. Accordingly, the first gear 500 may be rotated around the first support shaft 111.

The first external gear 520 may be engaged with the worm 210 so that the power generated from the motor part 200 may be transmitted to the first gear 500. Here, the first external gear 520 may be formed as a worm wheel that is engageable with the helical worm 210. That is, the worm 210 and the first external gear 520 may be engaged between two orthogonal shafts so that torque transmitted from the worm 210 to the first external gear 520 may be increased.

The worm 210 of the motor part 200 and the first external gear 520 of the first gear 500 may be coupled in the form of a worm gear so that an overall height of the actuator 1000 may be reduced. Accordingly, it is possible to manufacture the actuator 1000 having a small size.

The first internal gear 510 integrally formed with the first external gear 520 is rotated together with the first external gear 520 as the worm 210 rotates. The first internal gear 510 is formed to have an outer diameter less than that of the first external gear 520.

The first internal gear 510 is engaged with a second external gear 620 of the second gear 600 adjacent thereto to transmit power to the second gear 600.

Meanwhile, the second gear 600 receiving the power from the first gear 500 includes a second internal gear 610 and the second external gear 620. A second support hole 601 is formed in a center of the second gear 600, and a second support shaft 112 is inserted into the second support hole 601 to pass therethrough. Accordingly, the second gear 600 may be rotated around the second support shaft 112.

The second external gear 620 is engaged with the first internal gear 510. Here, since the second external gear 620 is formed to have an outer diameter greater than that of the first internal gear 510, when the first internal gear 510 and the second external gear 620 are rotated, the second external gear 620 is rotated at a reduced speed as compared with the first internal gear 510.

In other words, when the power is transmitted from the first gear 500 to the second gear 600, a reduction gear ratio is increased. Accordingly, torque transmitted from the first gear 500 to the second gear 600 is increased.

The second internal gear 610 integrally formed with the second external gear 620 is rotated together with the second external gear 620. The second internal gear 610 is formed to have an outer diameter less than that of the second external gear 620.

The second internal gear 610 is engaged with a third external gear 720 of the third gear 700 adjacent thereto to transmit power to the third gear 700.

Meanwhile, the third gear 700 receiving the power from the second gear 600 includes a third internal gear 710 and the third external gear 720. A third support hole 701 is formed in a center of the third gear 700, and a third support shaft 113 is inserted into the third support hole 701 to pass therethrough. Accordingly, the third gear 700 may be rotated around the third support shaft 113.

The third external gear 720 is engaged with the second internal gear 610. Here, since the third external gear 720 is formed to have an outer diameter greater than that of the second internal gear 610, when the second internal gear 610 and the third external gear 720 are rotated, the third external gear 720 is rotated at a reduced speed as compared with the second internal gear 610.

In other words, when the power is transmitted from the second gear 600 to the third gear 700, a reduction gear ratio is increased. Accordingly, torque transmitted from the second gear 600 to the third gear 700 is increased.

The third internal gear 710 integrally formed with the third external gear 720 is rotated together with the third external gear 720. The third internal gear 710 is formed to have an outer diameter less than that of the third external gear 720.

The third internal gear 710 is engaged with a fourth external gear 810 of the fourth gear 800 adjacent thereto to transmit power to the fourth gear 800.

Meanwhile, the fourth gear 800 receiving the power from the third gear 700 includes a fourth internal gear 850 and the fourth external gear 810. A fourth support hole is formed in a center of the fourth gear 800, and a fourth support shaft 114 is inserted into the fourth support hole to pass therethrough. Accordingly, the fourth gear 800 may be rotated around the fourth support shaft 114. Here, the fourth support hole may be a first hole 811 formed in the fourth external gear 810 and a second hole 851 formed in the fourth internal gear 850.

The fourth external gear 810 is engaged with the third internal gear 710. Here, since the fourth external gear 810 is formed to have an outer diameter greater than that of the third internal gear 710, when the third internal gear 710 and the fourth external gear 810 are rotated, the fourth external gear 810 is rotated at a reduced speed as compared with the third internal gear 710.

In other words, when the power is transmitted from the third gear 700 to the fourth gear 800, a reduction gear ratio is increased. Accordingly, torque transmitted from the third gear 700 to the fourth gear 800 is increased.

The fourth gear 800 is formed in a form in which the fourth internal gear 850 and the fourth external gear 810 are separately formed and coupled. Accordingly, the fourth internal gear 850 and the fourth external gear 810 are rotated together or when one of the fourth internal gear 850 and the fourth external gear 810 is fixed, the other thereof is formed so as to be rotatable independently. The fourth gear 800 will be described in detail below.

The fourth internal gear 850 is engaged with a rack gear 310 of the rod part 300. Accordingly, as the fourth internal gear 850 is rotated, the rod part 300 is linearly moved.

As described above, the reduction gear part 400 transmits the power generated from the motor part 200 to the rod part 300 through the plurality of gears being engaged in consecutive order. In this case, the reduction gear part 400 is configured to increase torque transmitted to the rod part 300 by reducing a rotational speed of the motor part 200 that is a power source.

Meanwhile, the actuator 1000 may further include a fixing stopper 910.

The fixing stopper 910 prevents the rod part 300 in a completely retracted state from shaking as well as preventing the rod part 300 from being easily extracted by an external force.

The fixing stopper 910 may include a body portion 911, a first extension portion 912, a second extension portion 913, and an elastic pressing portion 914.

A through-hole 915 is formed in the body portion 911. A fixing shaft 115 provided in the housing 100 is inserted into the through-hole 915 to pass therethrough.

The first extension portion 912 is formed to protrude from the body portion 911. Due to the first extension portion 912, the rotation of the fixing stopper 910 is restricted by a first rotation preventing portion 121. The first rotation preventing portion 21 is formed to protrude from a first plate 120 provided in the housing 100 and to restrict a rotation range of the first extension portion 912.

The second extension portion 913 protrudes from the body portion 911 by forming a preset angle with the first extension portion 912. Due to the second extension portion 913, the rotation of the fixing stopper 910 is restricted by a second rotation preventing portion 131. The second rotation preventing portion 131 is formed to protrude from a second plate 130 provided in the housing 100 and to restrict a rotation range of the second extension portion 913.

As described above, the first rotation preventing portion 121 and the second rotation preventing portion 131 restrict the rotation ranges of the first extension portion 912 and the second extension portion 913, thereby restricting a rotation range of the fixing stopper 910. The first rotation preventing portion 121 and the second rotation preventing portion 131 may also fix the fixing stopper 910.

The first rotation preventing portion 121 and the second rotation preventing portion 131 fix the fixing stopper 910 so that the elastic pressing portion 914 faces in a preset direction.

Here, the elastic pressing portion 914 is provided at an end of the second extension portion 913. When a certain force or more is applied to the elastic pressing portion 914, a slit is formed so that the elastic pressing portion 914 is elastically deformable.

Thus, in a process in which the rod part 300 is extracted and retracted, when a fixing protrusion 320 formed in the rod part 300 presses and passes through the elastic pressing portion 914, the elastic pressing portion 914 may be compressed, and thus, the rod part 300 may be extracted and retracted. In a state in which the rod part 300 is completely retracted, the fixing stopper 910 presses the fixing protrusion 320, thereby preventing the rod part 300 from shaking as well as preventing the rod part 300 from being easily extracted by an external force.

FIGS. 5A-5B show views of operation states of the actuator according to one embodiment of the present invention.

Referring to FIGS. 5A-5B, the actuator 1000 may further include a slide stopper 920.

When the rod part 300 is extracted or retracted, the slide stopper 920 moves along a slide rail 140 formed in the housing 100 and restricts the movement of the rod part 300.

Such a slide stopper 920 may include a first stopper 921, a second stopper 922, and a connection bar 923.

The first stopper 921 and the second stopper 922 are provided at both ends of the connection bar 923. That is, the first stopper 921 is provided at one end of the connection bar 923, and the second stopper 922 is provided at the other end of the connection bar 923.

A first slide groove (not shown) is formed in the first stopper 921, and a second slide groove 924 is formed in the second stopper 922. Here, the first slide groove has the same shape as the second slide groove 924 and is formed in the first stopper 921.

The slide grooves formed in the first stopper 921 and the second stopper 922 are fitted onto the slide rail 140. Accordingly, the slide stopper 920 may be moved along the slide rail 140.

Here, the first stopper 921 and the second stopper 922 provided in the slide stopper 920 restrict the movement of a movement section adjusting portion 330 provided in the rod part 300.

For example, in a process in which the rod part 300 is retracted, when the rod part 300 is completely retracted, the movement of the movement section adjusting portion 330 is restricted by the first stopper 921 that is supported on an inner surface of the housing 100. Therefore, the rod part 300 is prevented from being moved further in a retracting direction thereof.

In a process in which the rod part 300 is extracted, when the rod part 300 is completely extracted, the movement of the movement section adjusting portion 330 is restricted by the second stopper 922 supported by a stepped portion 141 formed in the slide rail 140. Therefore, the rod part 300 is prevented from being further moved in an extracting direction thereof.

The slide stopper 920 restricts the movement of the rod part 300 when the rod part 300 is retracted and extracted. Accordingly, the rod part 300 is moved only within a set section.

Figure 6:
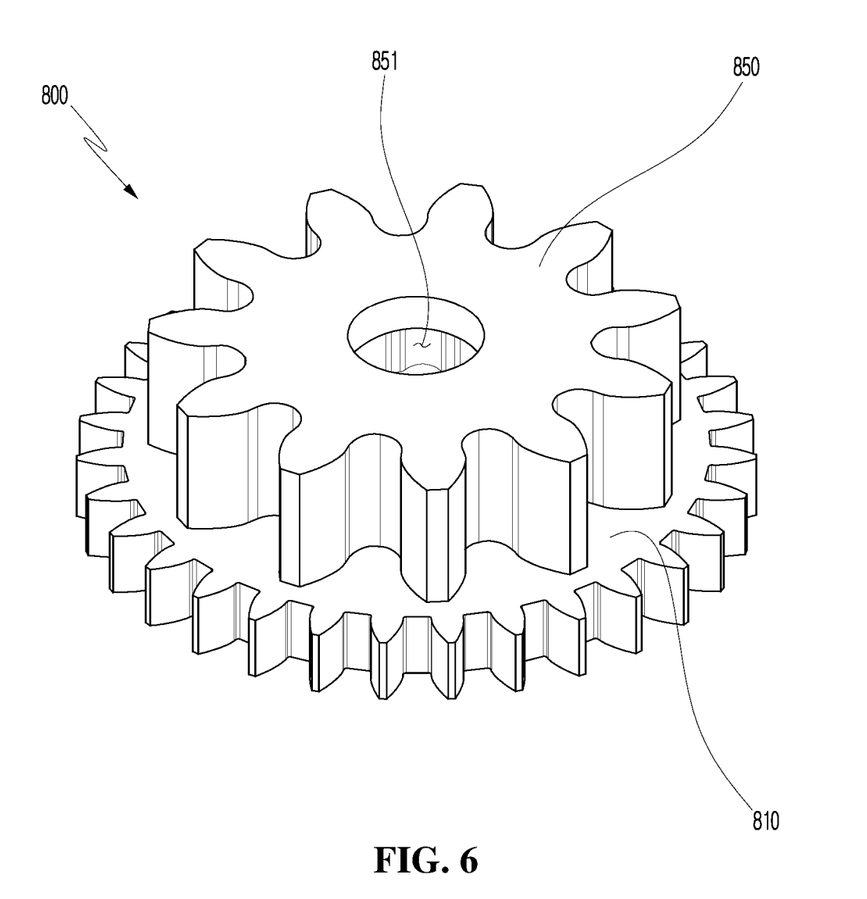
FIG. 6 is a perspective view of a fourth gear according to one embodiment of the present invention.
Figure 7:
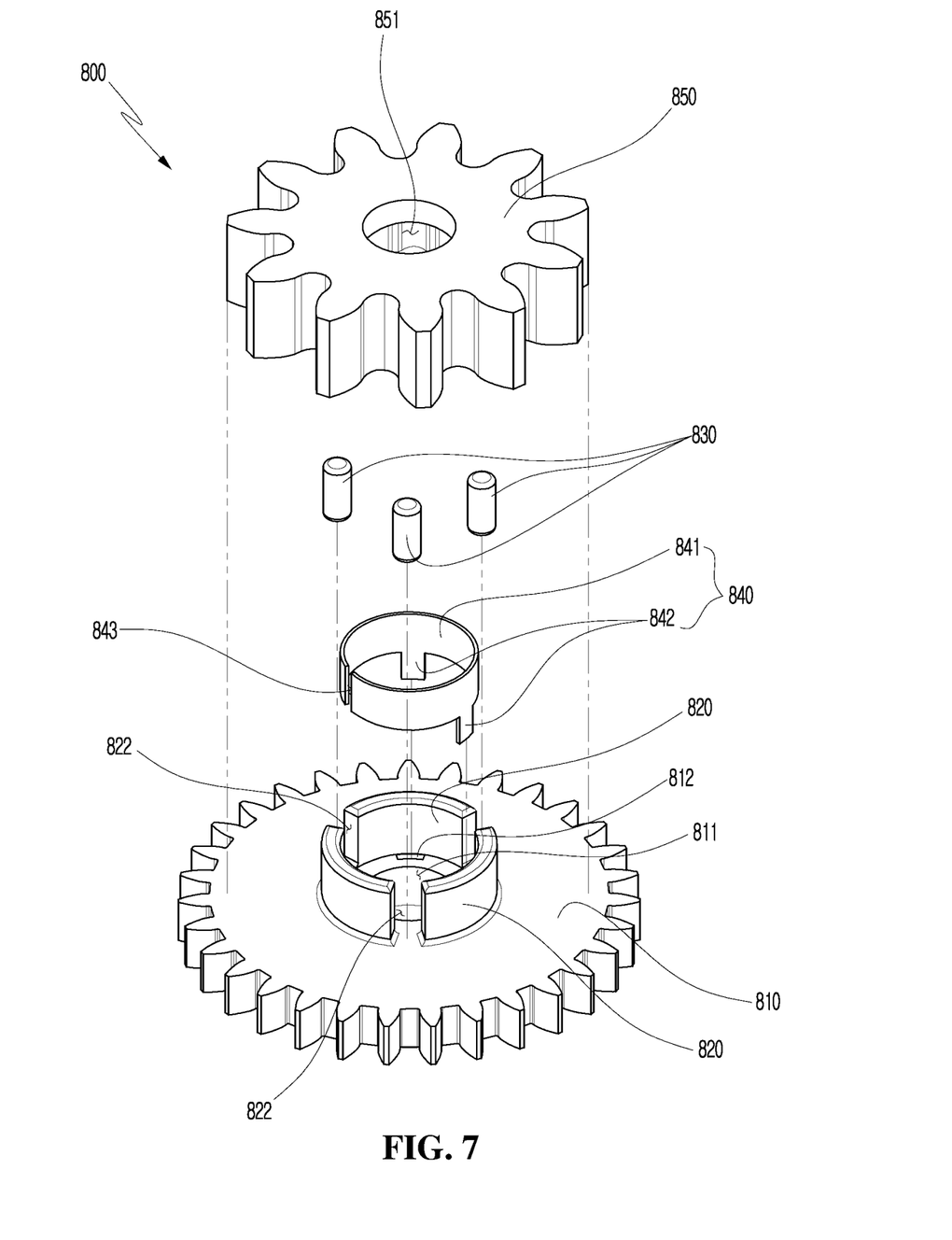
FIG. 7 is an exploded perspective view of the fourth gear viewed from above according to one embodiment of the present invention.
Figure 8:
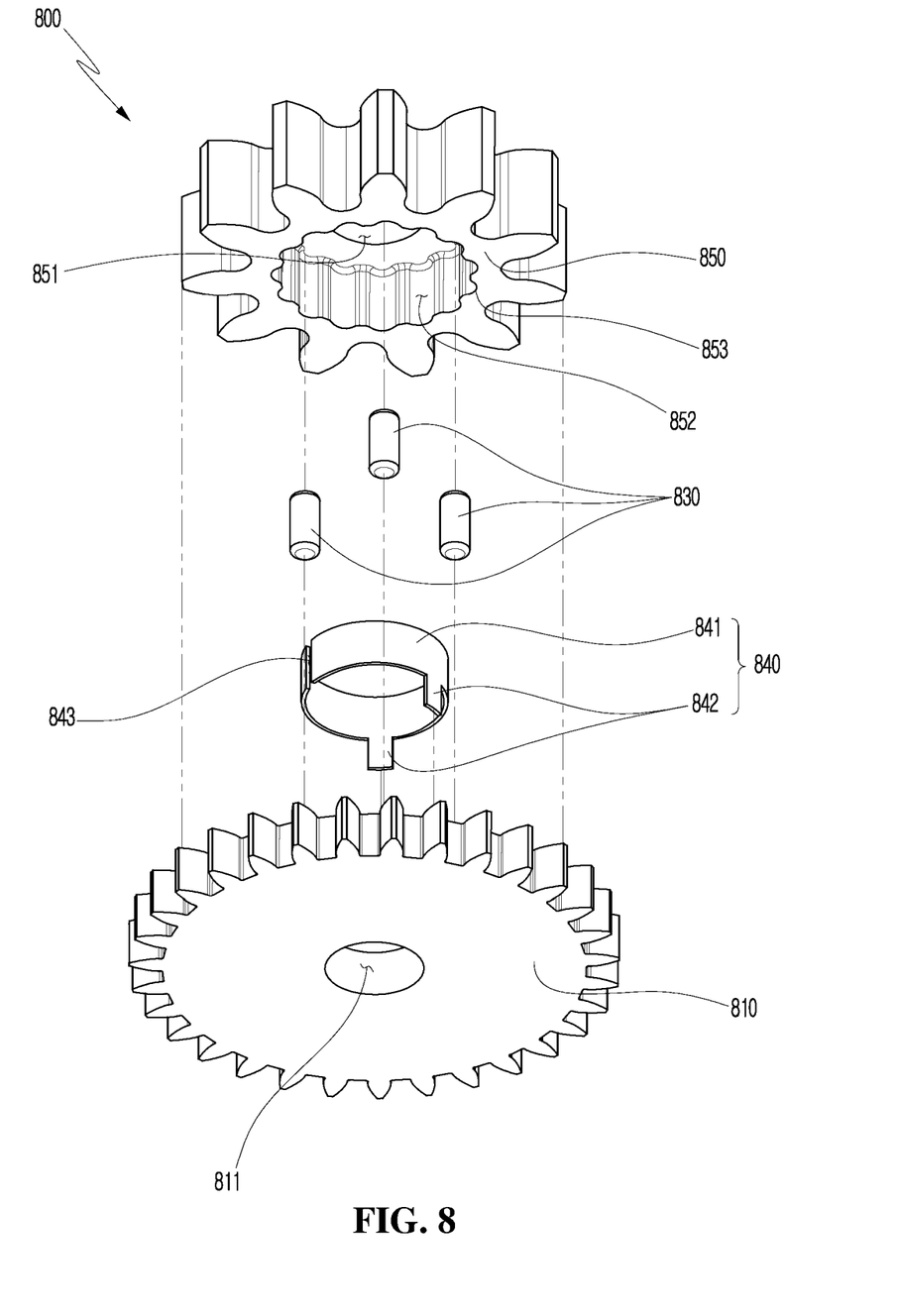
FIG. 8 is an exploded perspective view of the fourth gear viewed from below according to one embodiment of the present invention
Figure 9:
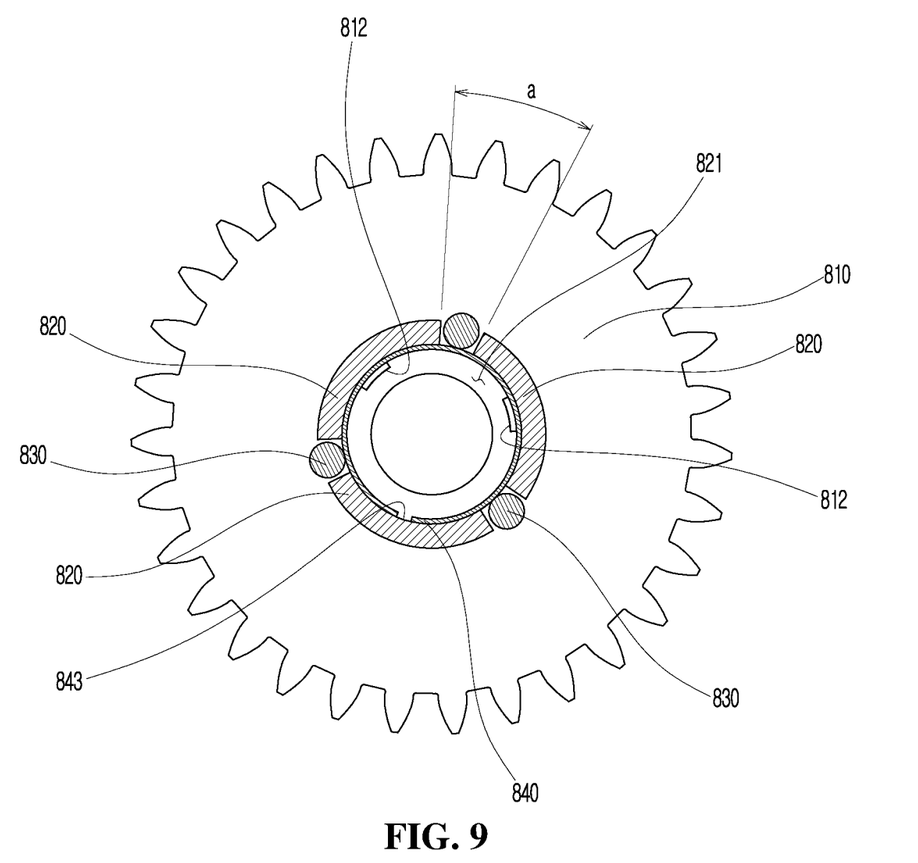
FIG. 9 is an exemplary cross-sectional view of a boss portion and a fourth external gear according to one embodiment of the present invention.
Figure 10:
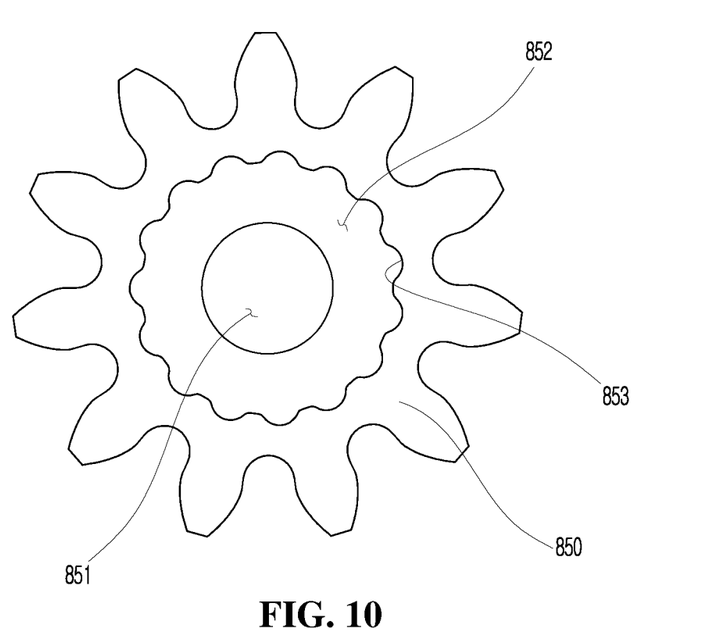
FIG. 10 is a bottom view of a fourth internal gear according to one embodiment of the present invention.

FIG. 6 is a perspective view of the fourth gear according to one embodiment of the present invention, FIG. 7 is an exploded perspective view of the fourth gear viewed from above according to one embodiment of the present invention, and FIG. 8 is an exploded perspective view of the fourth gear viewed from below according to one embodiment of the present invention. FIG. 9 is an exemplary cross-sectional view of a boss portion and the fourth external gear according to one embodiment of the present invention. FIG. 10 is a bottom view of the fourth internal gear according to one embodiment of the present invention.

As shown in FIGS. 6 to 10, the fourth gear 800 may include the fourth external gear 810, a boss portion 820, pins 830, an elastic portion 840, and the fourth internal gear 850.

Here, the fourth external gear 810 and the fourth internal gear 850 form an overall exterior of the fourth gear 800. In this case, the fourth external gear 810 is formed to have an outer diameter greater than that of the fourth internal gear 850.

The first hole 811, into which the fourth support shaft 114 is inserted to pass therethrough, is formed in a center of the fourth external gear 810. The fourth external gear 810 may be engaged with the third internal gear 710 adjacent thereto, and thus, power may be transmitted.

The fourth external gear 810 is integrally formed with the boss portion 820.

Here, the boss portion 820 has a hollow circular pipe shape and protrudes from an upper surface of the fourth external gear 810. In this case, the boss portion 820 protrudes from the upper surface of the fourth external gear 810 around the first hole 811. As described above, the boss portion 820 having the circular pipe shape with a hollow portion formed therein has an accommodation space portion 821 formed therein.

The boss portion 820 having the accommodation space portion 821 formed therein is formed to have an inner diameter greater than that of the first hole 811.

Pin guide grooves 822 are formed in the boss portion 820 at predetermined intervals. The pin guide grooves 822 divide the boss portion 820 into predetermined sizes.

Various numbers of the pin guide grooves 822 greater than or equal to two may be formed in the boss portion 820, and in the present invention, an example of a type in which three pin guide grooves 822 are formed will be described.

When the pin 830 is moved as the elastic portion 840 is compressed or restored, the pin guide groove 822 guides a moving direction of the pin 830. Preferably, the pin guide groove 822 may have a width corresponding to the pin 830. More preferably, the pin guide groove 822 may have a shape which is widened at a predetermined angle a as a distance from the first hole 811 is increased.

When the pin guide groove 822 has the widened shape, in a process in which the elastic portion 840 in a compressed state pushes the pin 830 toward a coupling groove 853 with a restoring force thereof, the pin 830 may be quickly seated in the coupling groove 853.

In addition, when the fourth internal gear 850 and the fourth external gear 810 are rotated independently, the pin 830 may smoothly press the elastic portion 840. That is, in a process in which the fourth internal gear 850 and the fourth external gear 810 are rotated independently, the pin guide groove 822 having the widened shape guides a smooth movement of the pin 830 so that the pin 830 smoothly presses the elastic portion 840.

The pin 830 is disposed in the pin guide groove 822 and has a cylindrical shape. Therefore, even when the pin 830 autonomously rotates, there is no problem in that the pin 830 is seated in the coupling groove 853 of the fourth internal gear 850.

The pin 830 is formed to have a height corresponding to a depth of the pin guide groove 822. This is to ensure that the pin 830 is stably moved along the pin guide groove 822 when the elastic portion 840 is compressed or restored.

The pin 830 is disposed in each of a plurality of pin guide grooves 822. Accordingly, a plurality of pins 830 may uniformly press the elastic portion 840.

Upper and lower ends of the pin 830 may be formed to be round. As described above, when the upper and lower ends of the pin 830 are formed to be round, a contact area with the fourth external gear 810 or the fourth internal gear 850 may be minimized. Therefore, when the elastic portion 840 is elastically deformed, the pin 830 may be moved quickly and smoothly.

Meanwhile, the elastic portion 840 elastically supports the pin 830 in a state of being inserted into the accommodation space portion 821. That is, the elastic portion 840 elastically supports the pin 830 in a state of being disposed between an inner diameter of the boss portion 820 and the first hole 811.

The elastic portion 840 may be formed as a leaf spring or a torsion spring. In this case, the elastic portion 840 formed as the leaf spring or the torsion spring may be formed to have a height corresponding to the height of the pin 830. This is to ensure that the elastic portion 840 entirely elastically supports the pin 830.

In the present invention, an example of the elastic portion 840 formed as the leaf spring will be described.

The elastic portion 840 may include a body plate portion 841 and fixing portions 842.

Here, the body plate portion 841 has a hollow cylindrical shape, and one end and the other end of the body plate portion 841 are spaced apart from each other to form an elastic adjustment space portion 843. That is, when the body plate portion 841 is transversely sectioned, the body plate portion 841 has a circular shape disconnected due to the elastic adjustment space portion 843.

Since the elastic adjustment space portion 843 is formed in the elastic portion 840, the elastic portion 840 may be elastically deformed. That is, when a certain external force or more is applied to the elastic portion 840 and the elastic portion 840 is compressed, one end and the other end of the body plate portion 841 are moved toward each other, and thus, the elastic portion 840 may be compressed.

When the certain external force or more is released from the elastic portion 840 and the elastic portion 840 is restored to the original state thereof, one end and the other end of the body plate portion 841 may be moved away from each other, and thus, the elastic portion may return to the original state.

As described above, since the elastic adjustment space portion 843, at which one end and the other end of the body plate portion 841 may be moved toward or away from each other, is formed in the elastic portion 840, the elastic portion 840 may be elastically deformed. Here, when the elastic portion 840 is restored, an outer surface of the body plate portion 841 comes into close contact with an inner surface of the boss portion 820 and presses the pin 830 against the coupling groove 853.

Meanwhile, the fixing portion 842 is formed to protrude from a lower portion of the body plate portion 841. The fixing portion 842 is inserted into a fixing hole 812 formed in an upper surface of the fourth external gear 810. As described above, when the fixing portion 842 is inserted into the fixing hole 812, the rotation of the elastic portion 840 is prevented. That is, the fixing hole 812 restricts the rotation of the fixing portion 842 to prevent the elastic portion 840 from being rotated. Thus, for example, in a process in which the fourth internal gear 850 and the fourth external gear 810 are rotated independently, the fixing portion 842 and the fixing hole 812 prevent the body plate portion 841 from being rotated.

When the fixing portion 842 is not present in the elastic portion 840, the elastic portion 840 may be rotated concurrently in a process in which the fourth internal gear 850 and the fourth external gear 810 are rotated. In this case, the elastic adjustment space portion 843 of the elastic portion 840 may be rotated to a position at which the pin 830 is supported. In this case, the elastic portion 840 cannot properly elastically support the pin 830.

In addition, when the elastic portion 840 is formed to be rotatable, the pin 830 may be fitted into the elastic adjustment space portion 843 in a process in which the elastic portion 840 is rotated. Furthermore, the pin 830 may be fitted between the boss portion 820 and the elastic portion 840.

Accordingly, the fixing portion 842 is provided in the elastic portion 840, thereby preventing the rotation of the elastic portion 840.

Here, the fixing hole 812 formed in the upper surface of the fourth external gear 810 is formed between an edge of the first hole 811 and the inner diameter of the boss portion 820. The fixing hole 812 may be formed to have a depth greater than or equal to a height of the fixing portion 842.

The fixing hole 812 is formed to have a width and a length greater than a width and a length of the fixing portion 842. This is to ensure that the elastic portion 840 is freely deformed when the elastic portion 840 is compressed and restored to be elastically deformed.

Specifically, since the fixing hole 812 is formed to be larger than the fixing portion 842, when the pin 830 presses the elastic portion 840 with a certain force or more, the elastic portion 840 is compressed, and the circular shape of the elastic portion 840 may diminish. In other words, when the elastic portion 840 is pressed and compressed by the pin 830, the size of the circular shape of the elastic portion 840 is decreased. In this case, the fixing portion 842 inserted into the fixing hole 812 is moved in the direction of a center of the first hole 811, and thus, the size of the circular shape of the elastic portion 840 may be decreased.

Even in a process in which the elastic portion 840 in a compressed state is expanded and restored to the original state thereof, the fixing portion 842 inserted into the fixing hole 812 may be moved away from the center of the first hole 811, and thus, the size of the circular shape of the elastic portion 840 may be increased.

As described above, since the fixing hole 812 is formed to be larger than the fixing portion 842, the elastic portion 840 may be elastically deformed freely.

Here, the fixing portion 842 and the fixing hole 812 are coupled to prevent the elastic adjustment space portion 843 from communicating with the pin guide groove 822. That is, when the fixing portion 842 and the fixing hole 812 are coupled, the elastic adjustment space portion 843 is formed to not communicate with the pin guide groove 822. Accordingly, the wedging of the pins 830 may be prevented in a process in which the elastic portion 840 is compressed and restored.

Meanwhile, the second hole 851, into which the fourth support shaft 114 is inserted to pass therethrough, is formed in a center of the fourth internal gear 850.

The fourth internal gear 850 may be engaged with the rack gear 310, and thus, power may be transmitted.

An insertion groove 852, into which the boss portion 820 is inserted, is formed on a lower surface of the fourth internal gear 850. Coupling grooves 853 having a concave shape, in which the pins 830 are seated, are formed in a circumferential surface of the insertion groove 852.

The coupling grooves 853 are formed to be serially connected along a circumference of the insertion groove 852. Accordingly, when the fourth internal gear 850 or the fourth external gear 810 is rotated independently, the pin 830 may compress the elastic portion 840 to move along the coupling grooves 853 which are formed to be serially connected.

An operation state in which the fourth internal gear 850 or the fourth external gear 810 is rotated independently will be described with reference to FIG. 11.

Figure 11:
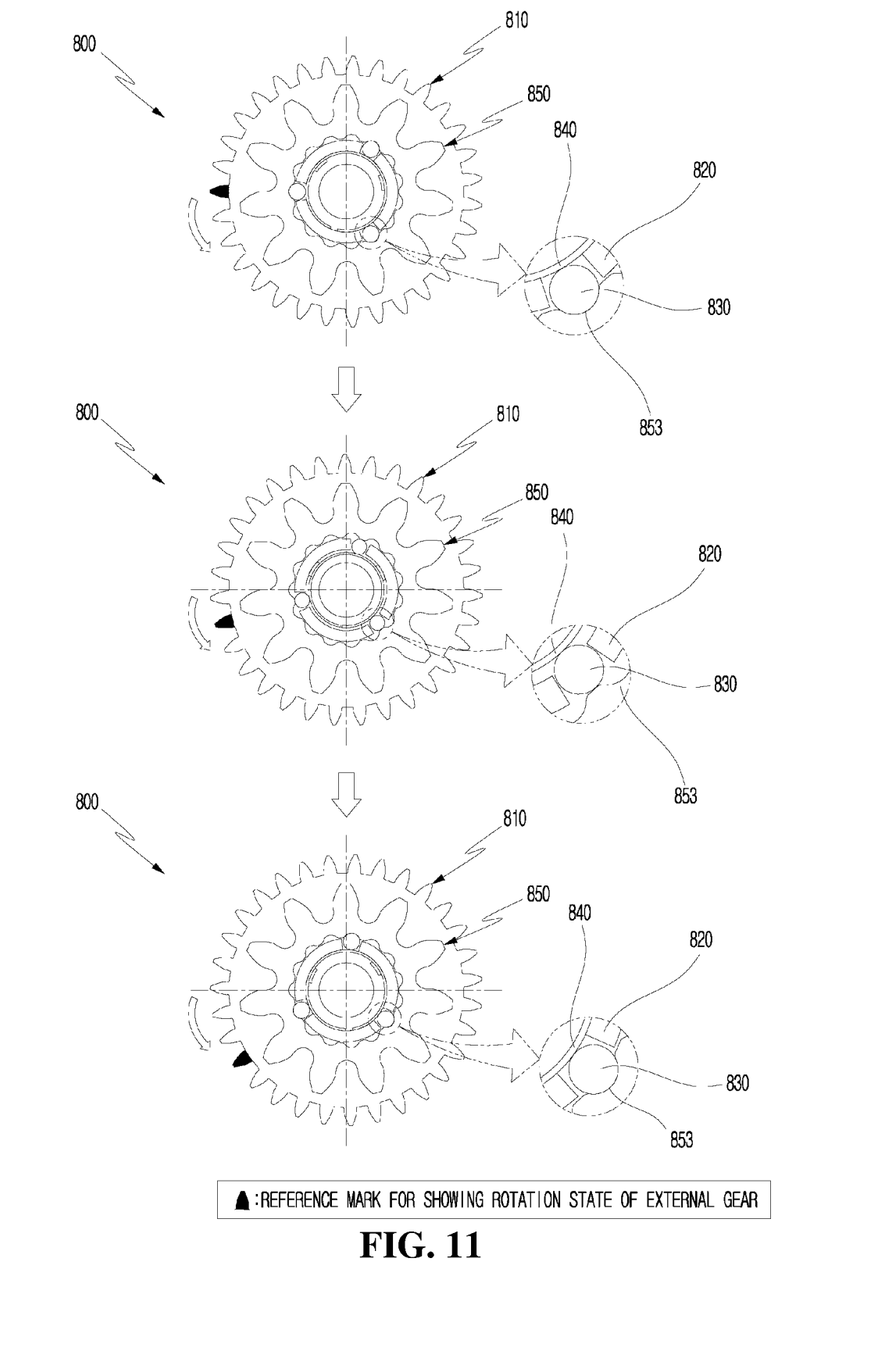
FIG. 11 is an exemplary view illustrating an operation process in which an external gear of a gear is rotated independently from an internal gear according to one embodiment of the present invention.

FIG. 11 is an exemplary view illustrating an operation process in which an external gear of a gear is rotated independently from an internal gear according to one embodiment of the present invention. Components denoted by the same reference numerals as the reference numerals shown in FIGS. 6 to 10 have the same functions as the components denoted by the reference numerals shown in FIGS. 6 to 10, and detailed descriptions of each of the components will be omitted.

FIG. 11 is an exemplary view illustrating an operation process in which a fourth external gear of a fourth gear is rotated independently from a fourth internal gear according to one embodiment of the present invention.

FIG. 11 shows a state in which only a fourth external gear 810 is rotated independently by power transmitted to the fourth external gear 810 in a state in which a fourth internal gear 850 is fixed by an external force. Here, unlike that shown in FIG. 11, the fourth external gear 810 may be fixed, and only the fourth internal gear 850 may be rotated independently.

As described above, when only the fourth external gear 810 is rotated in a state in which the fourth internal gear 850 is fixed by a certain force (external force) or more acting on the fourth internal gear 850, a pin 830 compresses an elastic portion 840 by the fourth internal gear 850 and moves along coupling grooves 853 which are formed to be serially connected. Such a case is possible when a magnitude of an elastic force of the elastic portion 840 is smaller than that of an external force acting on the fourth internal gear 850 and that of a torque of the fourth external gear 810.

In a process in which the pin 830 moves along the coupling groove 853, when the force applied to the fourth internal gear 850 is reduced below a certain force or the external force applied to the fourth internal gear 850 disappears, the pin 830 is seated and fixed in any one coupling groove 853 of a plurality of coupling grooves 853. When the fourth external gear 810 is rotated in such a state, the fourth internal gear 850 may be rotated together with the fourth external gear 810. In this case, the elastic force of the elastic portion 840 acts more greatly than the external force applied to the fourth internal gear 850 so that the elastic portion 840 presses the pin 830 against the coupling groove 853 without being compressed. Accordingly, the fourth internal gear 850 may be rotated together with the fourth external gear 810.

Since the elastic portion 840 is provided in the fourth gear 800, the fourth gear 800 may be formed so that the fourth internal gear 850 and the fourth external gear 810 may be rotated together or only one of the fourth internal gear 850 or the fourth external gears 810 may be rotated independently. That is, since the fourth internal gear 850 and the fourth external gear 810 are not integrally formed and are independently separated from each other, the fourth internal gear 850 or the fourth external gear 810 may be rotated independently.

In a state in which the fourth internal gear 850 and the fourth external gear 810 of the fourth gear 800 are integrally formed and a rod part 300 is fixed by an external force, when a motor part 200 transmits power to the external gear 810, the fourth gear 800 is maintained in a stationary state of not being rotated. In this case, overload may occur in the motor part 200 that supplies the power to the fourth external gear 810. The overload that occurs in the motor part is a cause of failure of the motor part.

Accordingly, the fourth gear 800 in the present invention is formed so that the fourth internal gear 850 or the fourth external gear 810 is independently rotatable, thereby preventing overload from occurring in the motor part 200 provided in the actuator 1000.

The embodiments are only an exemplary embodiment of the present invention, and it should not be interpreted that the scope of the present invention is limited by the embodiments.

Although the embodiments of the present invention have been described for illustrative purposes, those skilled in the art will appreciate that various modifications, additions and substitutions are possible without departing from the scope and spirit of the present invention. Therefore, the above-described embodiments of the present invention are merely exemplary in all aspects and should not be construed to be limited. For example, each component described to be of a single type can be implemented in a distributed manner. Likewise, components described to be distributed can be implemented in a combined manner.

The scope of the present invention is defined by the following claims and their equivalents rather than by the detailed description of the example embodiments. It should be understood that all modifications and embodiments conceived from the meaning and scope of the claims and their equivalents are included in the scope of the present invention.

The invention claimed is:

1. An actuator comprising:
a housing having an installation space therein;
a motor disposed inside the housing and configured to generate power;
a reduction gear assembly including a plurality of gear sets each including an internal gear and an external gear, the plurality of gear sets being engaged in consecutive order to transmit the power generated from the motor; and
a rod engaged with an endmost gear in the plurality of gear sets and configured to be linearly moved as the endmost gear is rotated,
wherein the actuator further comprises a fixing stopper which is configured to press a fixing protrusion formed in the rod and to prevent shaking of the rod in a state in which the rod is retracted,
wherein the fixing stopper includes:
a body portion having a through-hole, into which a fixing shaft of the housing is insertable, such that the body portion is rotatably connected to the housing;
a first extension portion protruding from the body portion;
a second extension portion protruding from the body portion to form a preset angle with the first extension portion; and
an elastic pressing portion disposed at an end of the second extension portion to press the fixing protrusion.

2. The actuator of claim 1, wherein the reduction gear assembly includes:
a first gear set which includes a first external gear engaged with a worm coupled to the motor and a first internal gear integrally coupled with the first external gear;
a second gear set which includes a second external gear engaged with the first internal gear and a second internal gear integrally coupled with the second external gear;
a third gear set which includes a third external gear engaged with the second internal gear and a third internal gear integrally coupled with the third external gear; and
a fourth gear set which includes a fourth external gear engaged with the third internal gear and a fourth internal gear separately formed and coupled with the fourth external gear and engaged with a rack gear formed in the rod,
wherein the fourth internal gear and the fourth external gear are configured to be rotated together or independently.

3. The actuator of claim 2, wherein the fourth gear set includes:
the fourth external gear having a first hole, into which a support shaft is insertable, formed in a center thereof;
a boss portion having a hollow circular pipe shape so that an accommodation space portion is formed therein, protruding from an upper surface of the fourth external gear around the first hole, and having pin guide grooves formed therein at preset intervals;
a plurality of pins each having a cylindrical shape and disposed in the pin guide grooves;
an elastic portion configured to be inserted into the accommodation space portion to elastically support the plurality of pins; and
the fourth internal gear having a second hole, into which the support shaft is insertable, formed in a center thereof, and having an insertion groove, into which the boss portion is insertable, formed in a lower surface thereof,
wherein the fourth internal gear further includes a plurality of coupling grooves each having a concave shape, in which the plurality of pins are to be seated, the plurality of coupling grooves being formed to be serially connected in a circumferential surface of the insertion groove.

4. The actuator of claim 3, wherein the elastic portion includes:
a body plate portion having a hollow cylindrical shape and having an elastic adjustment space portion such that one end and another end of the body plate portion are spaced apart from each other; and
a plurality of fixing portions protruding downward from the body plate portion,
wherein the plurality of fixing portions are inserted into fixing holes formed in the upper surface of the fourth external gear.

5. The actuator of claim 4, wherein each of the fixing holes has a width and a length that are respectively greater than a width and a length of the respective fixing portion inserted therein.

6. The actuator of claim 3, wherein each of the pin guide grooves is configured to guide a moving direction of the pin disposed therein when the elastic portion is compressed or restored, and
wherein each of the pin guide grooves is formed to be gradually widened in an outward direction.

7. The actuator of claim 1,
wherein rotation ranges of the first extension portion and the second extension portion are respectively restricted by a first rotation preventing portion protruding from a first plate disposed in the housing and a second rotation preventing portion protruding from a second plate disposed in the housing.

8. The actuator of claim 1, further comprising a slide stopper which is configured to move along a slide rail formed in the housing to restrict movement of the rod,
wherein the slide stopper includes:
a connection bar; and
a first stopper and a second stopper disposed at both ends of the connection bar,
wherein the first stopper and the second stopper are configured to restrict movement of a movement adjusting portion disposed in the rod.

* * * * *